United States Patent [19]

Still

[11] 4,112,969
[45] * Sep. 12, 1978

[54] REPLACEABLE ONE PIECE LINER FOR A GATE VALVE

[75] Inventor: Robert C. Still, Tucson, Ariz.

[73] Assignee: New Concepts, Inc., Tucson, Ariz.

[*] Notice: The portion of the term of this patent subsequent to Nov. 23, 1993, has been disclaimed.

[21] Appl. No.: 743,776

[22] Filed: Nov. 22, 1976

Related U.S. Application Data

[63] Continuation-in-part of Ser. No. 614,350, Sep. 17, 1975, Pat. No. 3,993,092.

[51] Int. Cl.² .............................................. F16K 3/02
[52] U.S. Cl. .................................. 137/454.2; 251/328; 251/329
[58] Field of Search ............... 251/326, 327, 328, 329; 137/454.2, 454.6

[56] References Cited

U.S. PATENT DOCUMENTS

| | | | |
|---|---|---|---|
| 2,893,684 | 7/1959 | Williams et al. | 251/329 X |
| 2,942,841 | 6/1960 | Stillwagon | 251/326 X |
| 3,050,077 | 8/1962 | Wheatley | 251/328 X |
| 3,164,363 | 1/1965 | Williams | 251/329 X |
| 3,350,058 | 10/1967 | Alden | 251/329 |
| 3,356,334 | 12/1967 | Scaramucci | 251/327 X |
| 3,749,114 | 7/1973 | Johnstone et al. | 251/329 X |

*Primary Examiner*—Arnold Rosenthal
*Attorney, Agent, or Firm*—Cahill, Sutton & Thomas

[57] ABSTRACT

A replaceable one piece bore and chest liner is enclosed within a pair of mirror image castings to define a gate valve. A cast gate, enveloped within molded material, cooperates with the liner to open and close the gate valve.

8 Claims, 7 Drawing Figures

REPLACEABLE ONE PIECE LINER FOR A GATE VALVE

CROSS REFERENCE TO RELATED APPLICATIONS

This a continuation-in-part of an application entitled "Gate Valve with Replaceable Liner" filed Sept. 17, 1975, assigned Ser. No. 614,350, now U.S. Pat. No. 3,993,092, and describing an invention made by the present inventor, which application is assigned to the present assignee.

BACKGROUND OF THE INVENTION

1. Field of the Invention

The present invention relates to gate valves and, more particularly, to a replaceable one piece molded liner for a gate valve.

2. Description of the Prior Art

Generally, a gate valve body is machined from a single piece casting. The chest and seat of the body are machined to receive a gate. The gate is milled with parallel opposed faces in close conformity with the valve body chest. Gate valves of this type must generally be replaced in toto after a period of use dependent upon the type and consistency of the fluid flowing through the gate valve. Such replacement is expensive.

In order to overcome the expenses attendant replacement of complete gate valves, various gate valves have been developed which incorporate individually replaceable chests, collars, backing strips and seats. U.S. Pat. No. 3,624,882 is representative of gate valves of this type. Herein, segregated elements forming the seat and seals are separately replaceable. U.S. Pat. No. 3,194,259, describes a gate valve having a replaceable unitary structure defining segregable and distinct elements such as the gate, gate housing, seats and gate actuating mechanisms, which structure is disposed within the gate valve body. U.S. Pat. No. 3,521,667, discloses a yet further type of control valve wherein a seat element and supporting structure is readily replaceable as a unit. Other patents describing related apparatus include U.S. Pat. Nos.: 2,893,684, 2,942,841, 3,050,077, 3,164,363, 3,350,058, 3,356,334 and 3,749,114.

In all the known prior art gate valves, the gates are machined to have parallel opposed surfaces in order to provide a good seal and smooth operation. The requirement for such machining tends to preclude the gates from being interchangeable and necessitates that the gates be custom fitted to the gate valve bodies and necessarily increases the cost of the available gate valves.

It is therefore a primary object of the present invention to provide a replaceable one piece liner which defines the chest and seat for a gate valve.

Another object of the present invention is to provide a one piece bore and chest liner for receiving the gate of a gate valve, which liner both seats and seals the gate.

Yet another object of the present invention is to provide a removable gate seat for gate valves.

Still another object of the present invention is to provide a low cost gate valve liner and body.

A further object of the present invention is to provide a low cost one piece liner for use in cast gate valve bodies.

A yet further object of the present invention is to provide a gate valve having low maintenance costs.

A still further object of the present invention is to provide a one piece liner for gate valves which eliminates the need for gaskets intermediate attached piping.

A still further object of the present invention is to provide a gate valve constructable from a wide range of metallic and nonmetallic materials, the selection of which material is primarily dependent upon the nature of the fluid flowing through the valve and without negatively affecting the operation of the valve.

These and other objects of the present invention will become apparent to those skilled in the art as the description thereof proceeds.

SUMMARY OF THE INVENTION

A one piece liner of pliant material is lodged within enveloping castings of a gate valve to receive, guide and seal a gate, which liner is readily replaceable in toto without assembly or disassembly of any liner components.

BRIEF DESCRIPTION OF THE DRAWINGS

The present invention may be described with greater specificity and clarity with reference to the following drawings, in which.

DESCRIPTION OF SPECIFIC EMBODIMENTS

Figure 1:
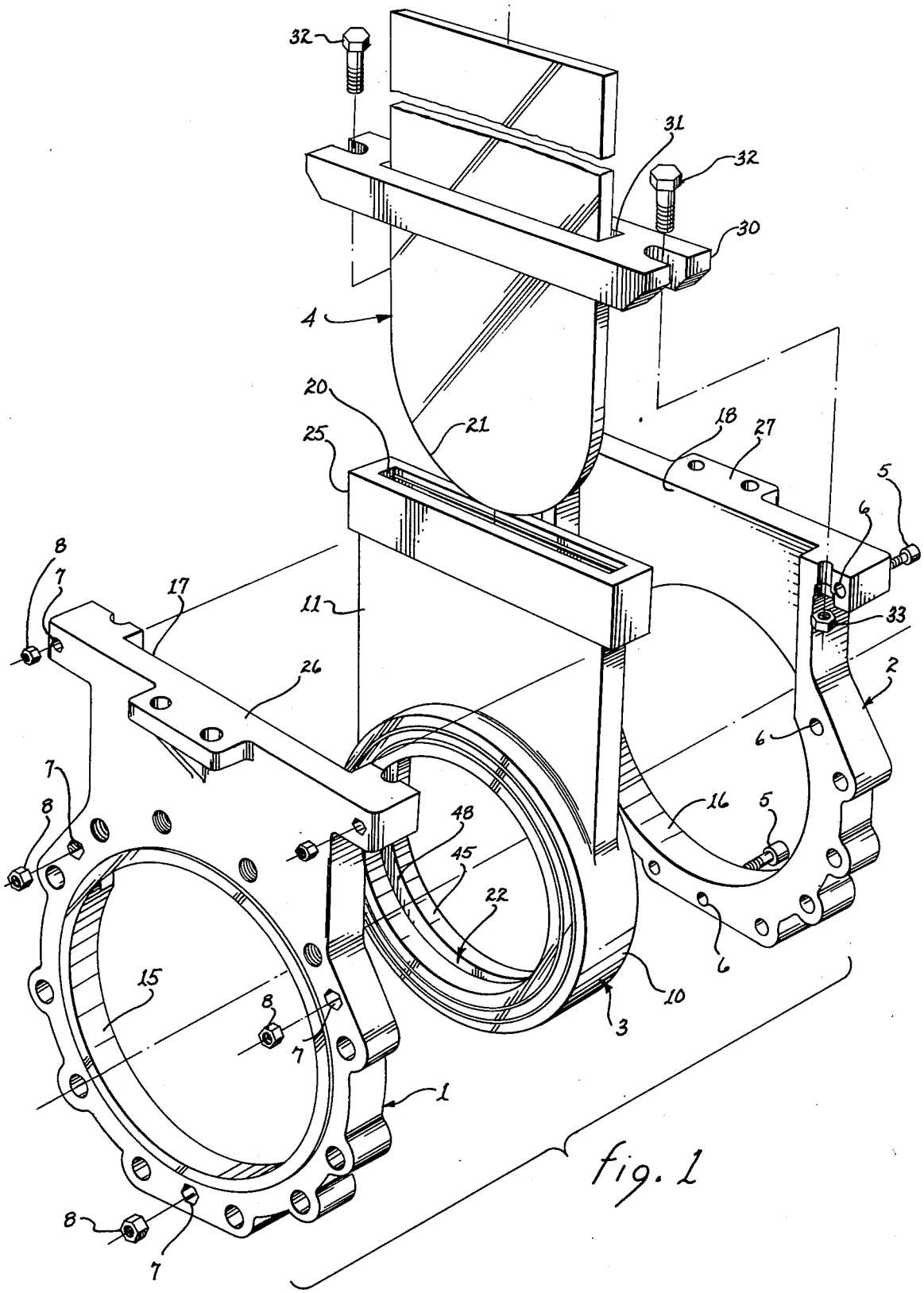
FIG. 1 is an exploded isometric view of the gate valve.

The major components of the present invention will be described with primary reference to FIG. 1. The valve body itself is formed of a pair of castings 1 and 2. These castings may be mirror images of one another. The castings are attached to and retained adjacent one another by means of a plurality of bolts 5 extending through holes 6 of casting 2 into holes 7 of casting 1 and ultimately engaging nuts 8.

A one piece liner 3 is lodged intermediate castings 1 and 2. The liner is formed of a ring 10 having a chest 11 extending upwardly therefrom. One annular half of the ring seats within bore 15 of casting 1 and the other annular half of the ring seats within bore 16 of casting 2. One lateral half of chest 11 seats within a conformingly configured recess 17 of casting 1 and the other lateral half of the chest seats within a similarly conforming recess 18 of casting 2. A passageway 20 extends through chest 11 to receive and accommodate passage of gate 4. A depression 48 is disposed within bore 45 of ring 10 and extends downwardly from the sides of passageway 20 to serve as a seat 22 for the mating edge of gate 4. A collar 25 extends about the upper edge of chest 11 and rests upon the upper flanged surfaces 26 and 27 of castings 1 and 2, respectively. This collar serves as a sliding seal and wiper to inhibit the flow of fluid through passageway 20 adjacent the surfaces of gate 4.

A stuffing box 30 includes a slot 31 for slidably receiving gate 4. The stuffing box rests upon collar 25 and is bolted to castings 1 and 2 by bolts 32 and nuts 33.

Gate 4 is a planar member having a semicircular end defined by edge 21, which edge is configured to conform with the mating cross-sectional configuration of depression 48.

Figures 2, 3:
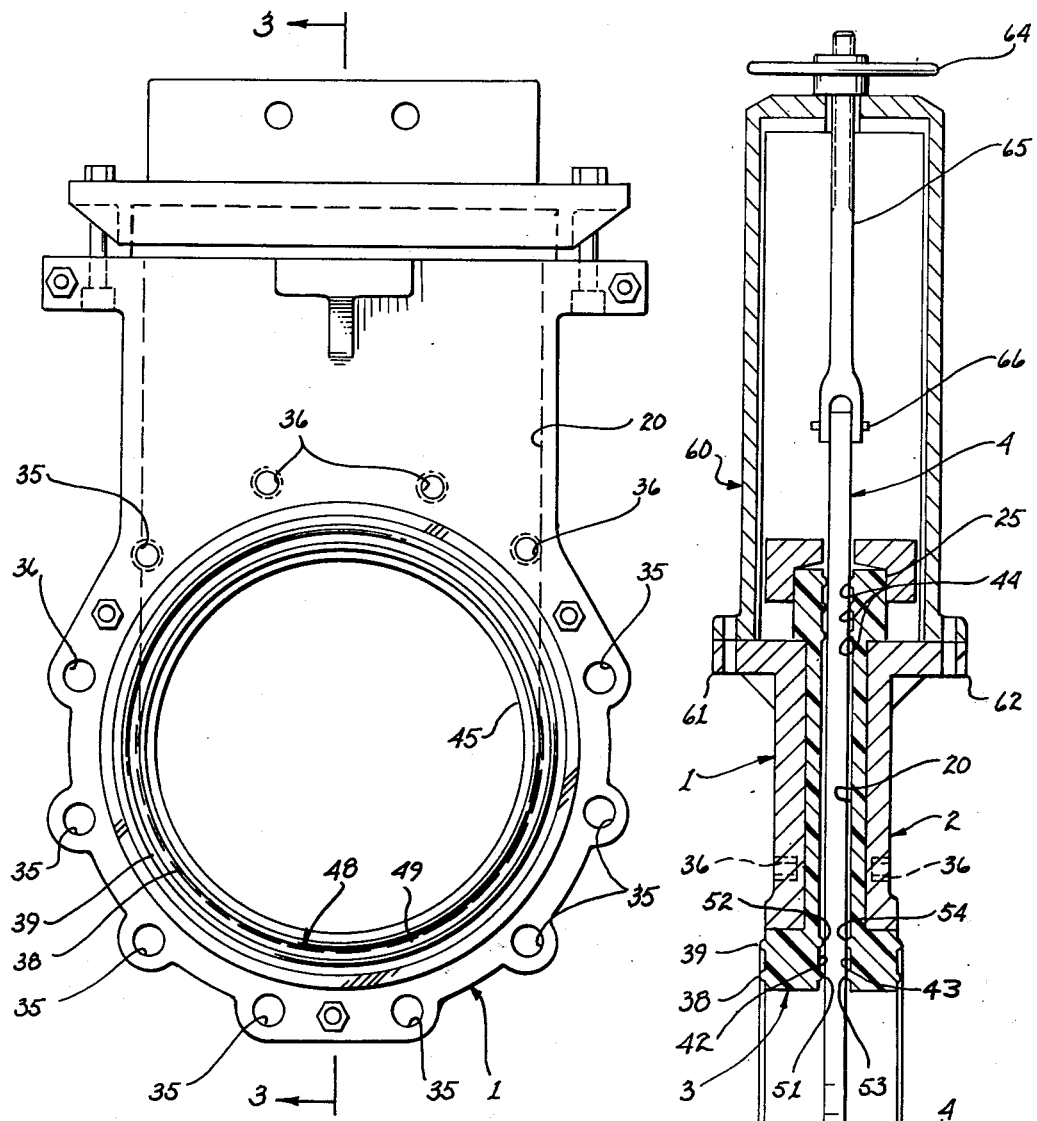
FIG. 2 is a front view of the gate valve.
FIG. 3 is a cross-sectional view of the gate valve taken along lines 3—3, as shown in FIG. 2.
Figure 4:
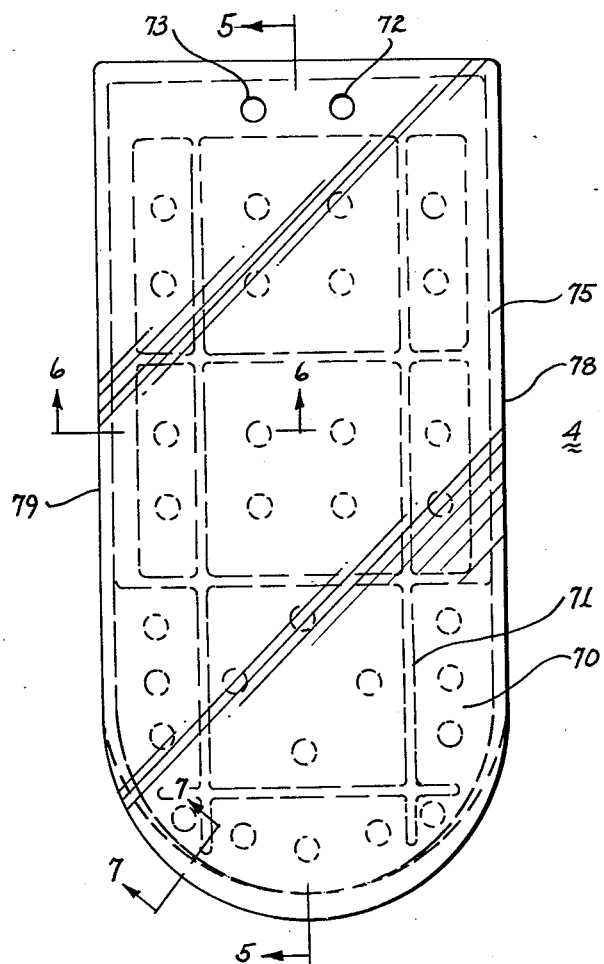
FIG. 4 illustrates the gate.
Figure 5:
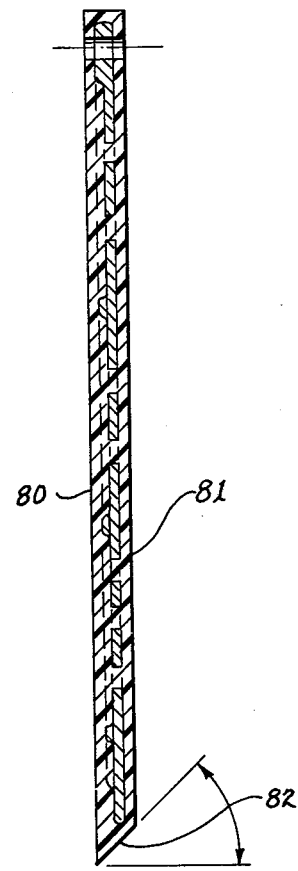
FIG. 5 is a cross-sectional view of the gate taken along lines 5—5, as shown in FIG. 5.
Figure 6:
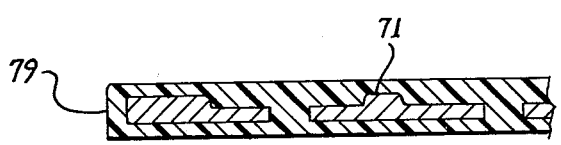
FIG. 6 is a partial cross-sectional view of the gate taken along lines 6—6, as shown in FIG. 4.

The constructional and functional aspects of liner 3 will be discussed with greater specificity with joint reference to FIGS. 2 and 3. FIG. 2 illustrates the gate valve in an assembled form. Bolt holes 35 are circumscribingly positioned about the bores of the mated castings. These bolt holes receive the bolts of nut and bolt assemblies extending from an annular flange of a pipe attached to one side of the gate valve to an annular flange of another pipe attached to the other side of the gate valve. Threaded cavities 36 disposed within each of the castings in proximity to the necks of the castings, threadedly receive and engage bolts extending from the annular flange of an adjacent connected pipe. From the above description, it may be appreciated that the pipe ends abutting opposite sides of the gate valve can be drawn tightly toward one another with the forces exerted thereby being absorbed by the castings without compressing or otherwise affecting the alignment of liner 3.

A pair of concentric D-rings 38, 39 are disposed upon each of annular faces 40 and 41 of ring 10 of the liner. These D-rings bear against a planar annular face of the attached pipe to establish a seal intermediate the ring of the liner and the adjacent pipe. It may therefore be appreciated that there is no need to employ gaskets intermediate the attached pipe and surface 37 of the castings nor is a seal necessary intermediate the peripheral surface of ring 10 and bores 15 and 16 of castings 1 and 2.

A plurality of horizontally oriented spaced apart seals 44 extend inwardly within the portion of passageway 20 extending through collar 25. These seals bear against the opposing surfaces of gate 4 to prevent the flow of fluid intermediate the gate and the collar.

As illustrated in FIG. 2, the width of passageway 20 is somewhat greater than bore 45 of liner 3. Depression 48, disposed within the lower half of bore 45, is in alignment with passageway 20 and of a depth equivalent to the overlap between passageway 20 and bore 45. As is apparent from the drawings, passageway 20, in combination with depression 48, serves to receive, guide and seat gate 4. For reasons which will become apparent, base 49 of depression 48 varies in angular orientation with respect to the surface of bore 45 from 0° at the lateral center of the bore to 45° at the bottom center of the bore. A D-ring seal 51 is disposed upon sidewall 42 of passageway 20 within the chest and extends along the aligned side of depression 48 and thereby circumscribes bore 45. A similar D-ring wiper 52 is also disposed upon sidewall 42 concentric with seal 51. A D-ring seal 53 is in opposed relationship to seal 51 upon sidewall 43 of passageway 20 and extends downwardly along the corresponding side of depression 48 concentric with bore 45 until it is terminated by sloping base 49. A D-ring wiper 54 is in opposed relationship to wiper 52 and extends downwardly concentric with seal 53 until it is also terminated by sloping base 49. Seals 51 and 53 prevent fluid flow intermediate the edge of gate 4 and depression 48 and prevent fluid flow from within bore 45 into passageway 20. Wipers 52 and 54 also serve a similar sealing and wiping function. As shown, seals 51, 52, 53 and 54 are disposed near the bottom of the opposing sidewalls 42 and 43 of gate passageway 20.

A yoke 60 is attached to and extends upwardly from laterally oriented flanges 61 and 62, the latter being formed as a part of castings 1 and 2, respectively. Yoke 60 supports a hand wheel 64 for engaging a threaded stud 65. Stud 65 is attached to gate 4 by means such as a nut and bolt assembly 66. As is well known in the art, rotation of hand wheel 64 produces vertical movement of stud 65 to raise and lower gate 4. It is to be understood that the illustrated yoke, hand wheel and stud are merely representative of a type of aparatus for selectively raising and lowering the gate.

The structural details of gate 4 will be described with particular reference to FIGS. 4, 5, 6 and 7. The primary structural element of the gate is formed of a cast core 70. A plurality of intersecting strengthening webs 71 are disposed upon one side of the core to provide rigidity and prevent bending or twisting of the gate. Attachment means, such as apertures 72 and 73 are disposed at the top of the gate for connection to gate raising and lowering means, such as stud 65 (see FIG. 3). Synthetic plastic material 75, such as urethane, is bonded to core 70 to completely envelope the core. The overall width thickness and length of the enveloped core is dictated by the dimensions of passageway 20 and depression 48 within liner 3.

Because the surface of gate 4 and the material of liner 3 are compliable, adequately close tolerances can be maintained with state of the art molding techniques. Moreover, seals 44, 51 and 53 and wipers 52 and 54 are configured to bear against the opposing surfaces of the gate with sufficient pressure and compliancy to establish a requisite sealing and wiping relationship. As is evident in the drawings, the opposing surfaces of gate 4 are spaced from the opposing sidewalls 42 and 43 of gate passageway 20.

Figure 7:
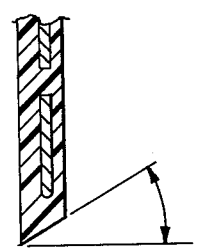
FIG. 7 is a partial cross-sectional view of the gate taken along lines 7—7, as shown in FIG. 4.

Vertical sides 78 and 79 of gate 4 are essentially perpendicular to lateral surfaces 80 and 81. The lower edges of lateral surfaces 80 and 81 are essentially semicircular but the radius of these edges are vertically off-set from one another. Thereby, side 82 varies angularly with respect to a plane defined by one of the lateral surface from an angle of 90° to an angle of 45° at the lower extremity of the base. That is, at the lower extremity of the gate, side 82, is at an acute angle with respect to lateral surface 80 and at an obtuse angle with respect to lateral surface 81. As illustrated in FIG. 7, the angle between side 82 and the lateral surfaces varies in proportion to the angular displacement away from the lower extremity of the gate.

From the above discussion, it may be appreciated that the configuration of the lower edge of gate 4 is positionally commensurate with base 49 of depression 48 within liner 3. Thus, when gate 4 is in its lowermost position, it will mate with depression 48. By maintaining an acute angle between lateral surface 80 and side 82, any sludge or other debris lodged within depression 48 as a result of fluid flow through bore 45 will tend to be displaced by the cleaving effect of side 82. Thereby, there exists little likelihood of sludge or debris inhibiting closure of the gate valve.

In summary, castings 1 and 2 do not have to be machined to high tolerances in order to effect adequate operation of the gate valve as none of the parts thereof are in direct control of the degree and accuracy of gate closure. Liner 3 can be molded of various synthetic or natural materials compatible with the fluid flowing through the gate and provided that the liner has some degree of pliancy. Gate 4 need not be machined but the core thereof can be cast by inexpensive processes. The material enveloping the core can be molded without jeopardizing the maintenance of sufficient tolerances; any variations in tolerance between gates is compensated for and accommodated by liner 3 and the seals and wipers forming a part thereof. Thus, each of the major elements of the gate valve can be manufactured relatively inexpensively and yet be suitable for use in controlling the flow of various types of corrosive or non-corrosive fluids. Furthermore, the gate valve is not limited in size by the characteristics of the material forming liner 3 and gate 4 as the castings (1, 2) and core 70 are of sufficient strength and serve as the load supporting elements. Similarly, the gate valve is not limited with respect to the pressure of the fluid flowing therethrough as neither the liner nor the material enveloping the gate core are the critical pressure regulating factors.

Necessarily, all gate valves require periodic maintenance to replace or repair the gate and/or the gate seat. In the present invention, such maintenance is quickly accomplished by separating the castings from one another and replacing the liner in toto. As the liner readily fits within mating bores and recesses, little skill is necessary to effect accurate replacement. Similarly, the gate is readily replaced without any honing, machining or otherwise fitting the gate within its supporting structure and seat. Again, highly skilled artisans are not needed to perform maintenance upon the gate and yet there is little danger of reassembling the gate valve incorrectly or improperly.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. In a gate valve having a positionable gate with opposing surfaces disposed therein for regulating the flow of fluid intermediate an attached pair of pipes, the improvement comprising a pliant liner molded in one piece for receiving, guiding and seating the gate, said liner including:

a. a chest having a gate passageway with opposing sidewalls spaced from the opposing surfaces of the gate disposed therebetween;
   b. a ring defining a bore and extending downwardly from said chest in general planar alignment therewith; and
   c. a depression disposed within said bore for defining a seat for the gate; whereby, said liner avoids the assembly and disassembly of segregable elements during replacement of the gate guiding, seating and sealing elements of the gate valve.

2. The improvement as set forth in claim 1, said liner further including:

a. first seal means disposed near the bottom of the opposing sidewalls within said chest and being in sealing contact with the gate for preventing a flow of fluid through said gate passageway intermediate said chest and the gate; and
   b. further seal means disposed within said depression for preventing a flow of fluid through the bore of said ring on seating of the gate within said depression.

3. The improvement as set forth in claim 2 wherein the material of said liner is functionally compatible with the material of the gate in contact with said liner.

4. The improvement as set forth in claim 3 wherein said liner and the material of the gate in contact with said liner are of the same non-metallic material.

5. The improvement as set forth in claim 2 wherein said seal means comprises at least one seal within said gate passageway and extending inwardly and transverse to the direction of movement of the gate.

6. The improvement as set forth in claim 5 wherein said further seal means comprises at least one annular D-ring seal disposed upon one side of said depression for sealing engagement with a face of the gate.

7. The improvement as set forth in claim 6 wherein said further seal means includes at least one D-ring seal disposed upon another side of said depression for sealing engagement with another face of the gate.

8. The improvement as set forth in claim 7 including yet further seal means disposed upon the axial ends of said ring of said liner for engagement with the axial ends of the attached one of the pair of pipes; whereby, said yet further seal means obviates the need for gaskets intermediate the gate valve and the pair of pipes.

* * * * *